United States Patent [19]

Jovanovic

[11] Patent Number: 4,810,856
[45] Date of Patent: Mar. 7, 1989

[54] ROTARY-SPIT STEAM COOKING APPARATUS

[76] Inventor: Dragomir Jovanovic, 6, Impasse Jean Moulin, 38.800 Pont de Claix, France

[21] Appl. No.: 67,944

[22] Filed: Jun. 29, 1987

[30] Foreign Application Priority Data

Jun. 27, 1986 [FR] France .................. 86 09693

[51] Int. Cl.$^4$ .......... A47J 37/04; A47J 27/04
[52] U.S. Cl. .................. 219/401; 99/421 H; 99/419; 126/20
[58] Field of Search .......... 219/400, 401, 440; 99/419, 421 R, 421 H; 126/369, 20, 41 B

[56] References Cited

U.S. PATENT DOCUMENTS

| | | | |
|---|---|---|---|
| 931,088 | 8/1909 | Roberts | 219/401 |
| 1,152,241 | 8/1915 | Tomlinson | 99/419 |
| 1,337,122 | 4/1920 | Doak | 99/421 H |
| 1,485,253 | 2/1924 | Devlin | 99/419 |
| 2,898,437 | 8/1959 | McFarland | 219/400 |
| 3,108,532 | 10/1963 | Ray | 219/413 |
| 3,339,480 | 9/1967 | Raman | 99/421 H |
| 3,639,725 | 2/1972 | Maniscalco | 219/401 |
| 3,908,532 | 9/1975 | Underwood | 99/419 |
| 4,506,598 | 3/1985 | Meister | 219/401 |

Primary Examiner—E. A. Goldberg
Assistant Examiner—Teresa J. Walberg
Attorney, Agent, or Firm—Herbert Dubno

[57] ABSTRACT

An infrared cooking oven is provided with a rotatable spit which is hollow and is connected to a boiler producing steam which is fed into the spit and through orifices of the latter into meat mounted on the spit. The internal steam cooking coupled with the combined infrared and steam cooking of the exterior, reduces substantially the cooking time while ensuring that the meat will not dry out.

11 Claims, 2 Drawing Sheets

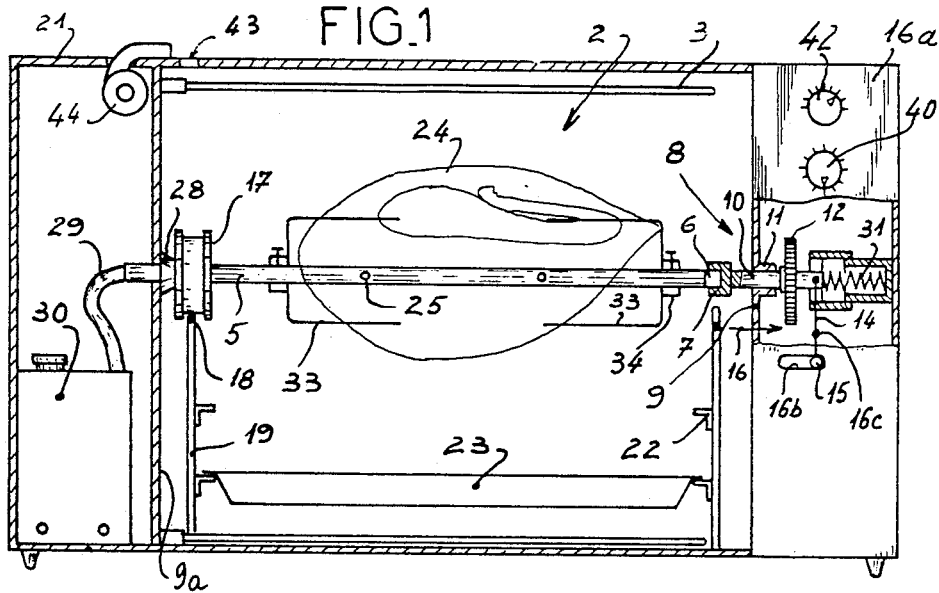
FIG. 1
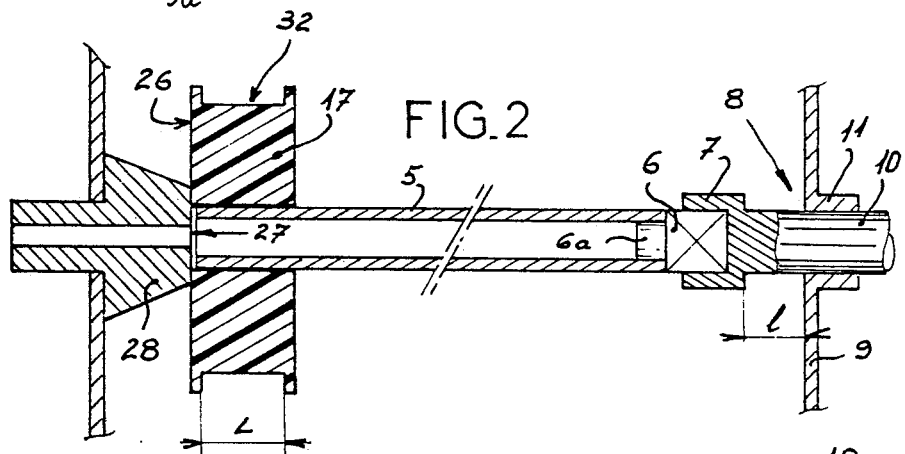
FIG. 2
FIG. 3
FIG. 4
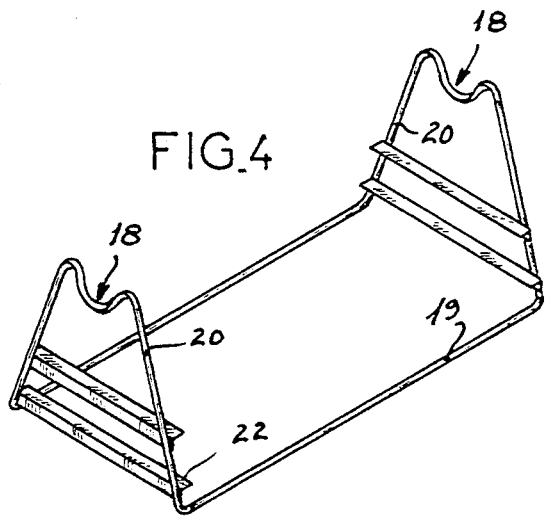

ROTARY-SPIT STEAM COOKING APPARATUS

FIELD OF THE INVENTION

My present invention relates to a cooking apparatus of the type which comprises a housing provided with means for generating infrared radiation and a rotary spit or rotisserie upon which a food item, usually meat, can be mounted for cooking while rotating.

More particularly, this invention relates to an apparatus for the combined steam and infrared cooking of meats on a rotary spit.

BACKGROUND OF THE INVENTION

Rotary-spit cooking apparatus has been provided heretofore and generally consists of a specialized oven or grill equipped with means for rotatably mounting and driving a rotary spit or rotisserie upon which a food item, usually meat, e.g. fowl, can be impaled for infrared cooking while being rotated.

During the cooking operation, which usually takes a relatively long time, fats released from the food article tend to collect on the walls of the housing as a result of the combination of rotation thereof and spattering resulting from infrared heating. In addition, the food article tends to dry out and there is almost invariably the danger of charring of the surface of the food article, such as the skin of the fowl. As a consequence, repeated and frequent basting may be required of the food article in the juices which are formed.

Mention may be made of an improved cooking technique developed by me and described in the French application No. 84.07985 filed May 17, 1984 and the corresponding U.S. application Ser. No. 734,938 filed May 16, 1985 and issued as U.S. Pat. No. 4,655,192 on Apr. 7, 1987.

That patent described a cooking apparatus utilizing the injection of steam at atmospheric pressure, the apparatus comprising a boiler for producing the steam and which is injected into the cooking apparatus which is brought to a temperature of the order of 100° C. This apparatus is capable of reducing the cooking time by combining the advantages of conventional cooking with that of steam cooking.

However, it has not been possible heretofore to apply this technique to rotary-spit cooking.

OBJECTS OF THE INVENTION

The principal object of the present invention is, therefore, to provide an apparatus which eliminates the drawbacks of earlier rotary-spit cooking apparatuses.

Another object of my invention is to provide an apparatus which allows a combination of radiative cooking with steam cooking to reduce the cooking time for a particular food item.

It is also an object of the invention to improve upon the apparatus described in the last-mentioned patent.

SUMMARY OF THE INVENTION

These objects and others which will become apparent hereinafter are attained, in accordance with the invention, in an apparatus which comprises a housing, means in the housing for the infrared heating and cooking of a food article received in the housing, i.e. one or more infrared heating elements preferably disposed proximal to a wall or the walls of the housing, a rotary spit journaled in the housing and adapted to carry the food item for rotating it during a cooking operation, means for driving the spit and a steam generator. According to the invention, the rotary spit is tubular and is formed with at least one radial perforation opening outwardly at a part of the spit receiving the food item. Means is provided for connecting the steam generator to the interior of the rotary spit so that steam produced by the generator can be injected into the interior of the food article or the spit with the advantages discussed below.

Preferably, the spit connected to the drive means at one end is detachably engageable at the opposite end with rotary joint through which the steam generator is connected to the interior of the spit which has a steam injection nozzle opening into the rotary joint.

Because of the injection of steam into the interior of the fowl or other food item rotated on the spit during the duration of cooking via the infrared heaters, the fowl is cooked simultaneously, externally by the infrared action and internally by the steam which is introduced at atmospheric pressure into the abdominal cavity of the fowl.

Vapor which leaves the abdominal cavity of the fowl can enter the housing around the fowl and can contact the exterior of the fowl or other food item to ensure infrared cooking thereof while retarding carbonization of its skin.

During cooking, the presence of the steam tends to to preserve the tenderness of the meat and reduces or prevents drying out of the latter.

Furthermore, the steam cooking effected within the interior of the fowl or other food article tends to melt the fats of the animal and form a juice which deposits in the cavity of the fowl and by rotation of the spit provides a permanent basting of the interior of the chicken and also can ensure its aromatic impregnation if cooking condiments have previously been rubbed into or otherwise placed in the abdominal cavity.

The combination of cooking with infrared radiation with steam cooking permits a reduction in the cooking time of the order of 50% and, in most instances, totally suppresses any projection of grease on the walls of the housing. It appears that the steam ensures a rapid superficial cooking of the fowl both internally and externally so that the fowl is sealed against projecting losses of the grease.

The rapid loss of fat from the cooked article is thereby minimized.

According to a feature of the invention, the drive device is provided at only one end of the tubular spit and can include means which can be retracted by an actuator from the rotary spit, thereby freeing the driven end of the latter and enabling it to be lifted from a cradle on which the rotary spit is supported at least at the opposite end provided with the rotating joint. The vapor distribution nozzle can project into the housing at this other end and can be fixed against rotation in a wall of the housing and can have a planar surface which engages flatly against a roller riding in the cradle, carried by the spit and urged against the flat surface of the nozzle by a spring forming part of the drive unit and biasing the roller against the nozzle.

This arrangement forms a relatively simply rotatable joint requiring a minimum of manipulation to position the spit with the food article thereon while nevertheless ensuring affective delivery of the steam tool. This joint provides an effective seal for the steam which is at atmospheric pressure.

BRIEF DESCRIPTION OF THE DRAWING

The above objects, features and advantages of my invention will become more readily apparent from the following description, reference being made to the accompanying highly diagrammatic drawing in which:

FIG. 1 is an elevational view, partly in section as seen from the front of a cooking apparatus according to the invention in the case in which it is used to cook a fowl;

FIG. 2 is a detail view of the rotary joint and the connection of the drive unit with the spit of the invention;

FIG. 3 is a transverse section drawn to a larger scale of a means for connecting a drive fork to the tubular spit;

FIG. 4 is a perspective view of the cradle supporting the spit; and

SPECIFIC DESCRIPTION

Figure 5:
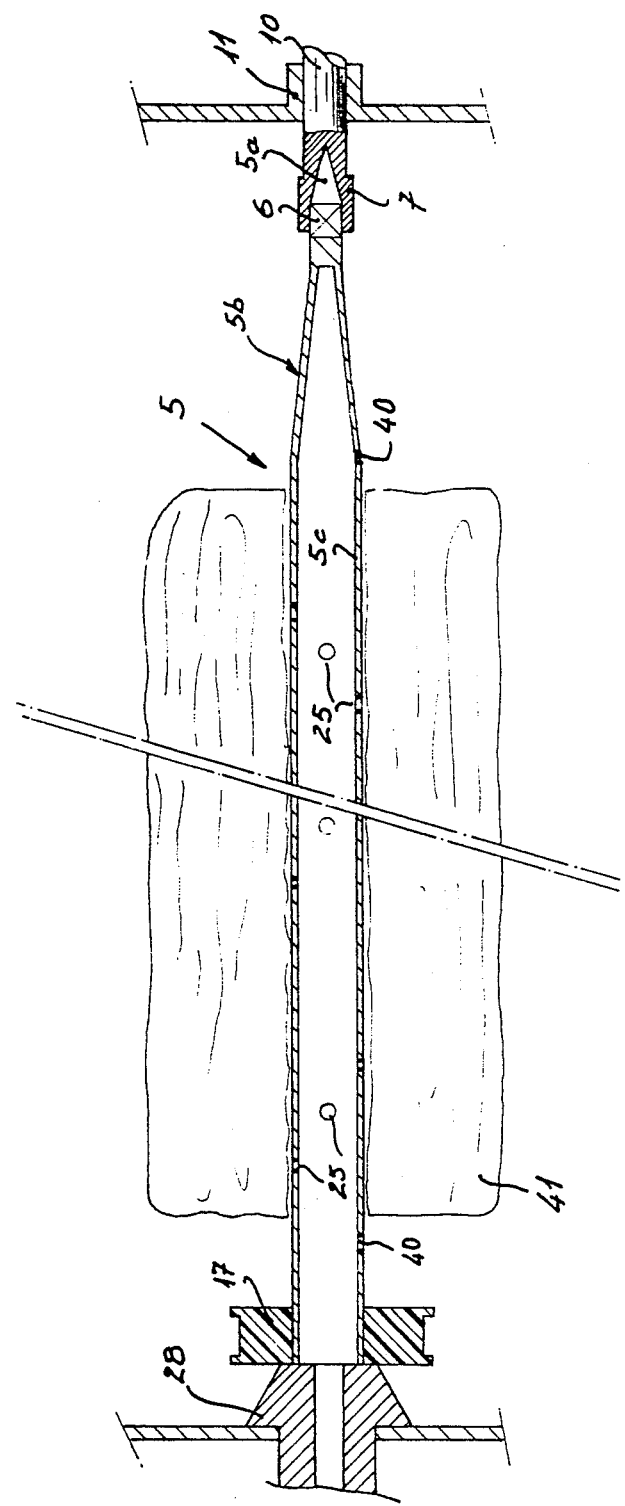
FIG. 5 is a cross-sectional view of a modified rotary spit in accordance with the invention, carrying some other type of meat, such as a beef roast to be cooked.

In FIG. 1, I have shown an apparatus for cooking an article of meat such as a fowl 24 and which comprises a housing 2 formed with a front door which can be opened in a standard manner and which has not been illustrated.

This housing is formed with heating means consisting at least in part of infrared heating elements 3 which can be provided with resistance heaters and a number of which can be spaced apart in the housing although only one has been illustrated.

The apparatus also can include a longitudinal spit 5, one end of which is provided with a male entrainment member 6, e.g. a square or prismatic shaft end which is adapted to cooperate with a socket forming a female member 7, constituting part of a drive unit 8.

In the embodiment illustrated, the socket 7 is adapted to project on a shaft 10 through a lateral wall 9 of the housing.

More specifically, the socket 7 which has a square recess adapted to complementarily receive the square formation 6 on the spit 5 is formed at the end of a shaft 10 which is free to rotate in a bearing 11 on the wall 9 of the housing and which can axially be displaced in the direction of the arrow 16.

The shaft 10 carries a gear 12 which is driven by a pinion on a motor which has not been shown and is mounted on the housing.

As noted, the shaft 10 is slidable longitudinally in the bearing 11 and can be actuated by means such as a lever 14, controlled from the exterior of the housing.

To this end the lever 10 is provided as a fork which engages the shaft 10 and is displaceble by a control button 15 projecting from the front face of the casing 16a at the right-hand side of the housing. The button 15 can be slid in a slot 16b of the casing so that upon shifting of the button 15 to the left, the fork 14 pivots about its fulcrum 16c on the casing 16a to draw the shaft 10 to the right.

This movement in the direction of arrow 16 withdraws the socket 7 from engagement with the spit and allows removal of it from the housing and also permits insertion of the spit into place when the button is released and a spring 13 presses the shaft 10 to the left.

At its opposite end, the spit is rigid with a roller 17 which can ride in a cradle 18 of a removable frame 19 best seen in FIG. 4. The removable frame 19 comprises two such cradles on uprights 20 at opposite ends of the frame, the uprights 20 carrying racks 22 on which a pan 23 can be placed for collection of the cooking juices. The cooking juices in this case will include any condensation from the steam which is injected as will be described. The juices need not be used for basting, although they can be and are recoverable for making into gravy.

According to the invention, moreover, the spit 5 is tubular, i.e. is hollow with the internal bore being closed by a plug 6a at its end provided with the square shank 6 (see FIG. 2).

Perforations 25 are provided at least in the region in which the meat article is to be mounted on the spit, these perforations connecting the interior of the spit 5 with the exterior. The zone in which the holes are provided is, of course, the zone 24 over which the meat article extends. The perforations are, in the embodiment seen in FIG. 1, two in number and are spaced so as to open into an internal cavity of the fowl of large dimensions or into respective cavities of two smaller fowls which can be mounted on the spit, e.g. squab or quail.

The plug 6a may be formed unitarily with the square member 6 and force-fitted into the spit 5.

At the free end of the spit 5 a rotary joint is formed, utilizing the roller 17 which preferably is cemented to the spit and is composed of a material having a low coefficient of friction, such as polytetrafluoroethylene. This roller has a planar end face 26 juxtaposed with a planar end face 27 formed on the end of a fixed nozzle 28 projecting into the housing opposite the drive unit 8.

This nozzle is fixed on the opposite lateral wall 9a of the housing and is connected by a pipe 26 as seen in FIG. 1 to an instantaneous-heating boiler or vapor generator 30 of the type described in the aforementioned patent. The boiler 30 is disposed in a casing 21 shown on the left side of the housing 2.

The face 26 of the roller 17 is pressed against the face 27 of the nozzle 28 by the compression spring which continuously acts against the shaft 10 in a direction opposite to that of the arrow 16 to maintain an effective seal at the faces 26, 27; the spring also serves to retain the socket 7 in engagement with the male formation 6.

It can be seen from FIG. 2, for example, that the roller 17 is provided with an internal groove 32 whose width L is at least equal to or preferably greater than the displacement of the drive unit 8 such that the play of this roller is sufficient and the roller cannot prevent the sealing contact or the retraction of the spit from its engaged position.

The tubular spit 5 can have a prismatic transverse section, e.g. a square section, but preferably is of circular cross section. In this case, each of the forks 33 which can serve to impale the food item to prevent relative rotation of the spit and the food item, is associated with a stirrup 34 having a large contact surface against the spit.

In a preferred embodiment of this stirrup, each stirrup has opposite a threaded bore 35 receiving a butterfly screw 36, a rounded engagement shank 37 whose arc segmental shape is complementary to that of the circular arc of the spit. The spit 36 is provided with an arc segmental shoe 38 which is pressed against the spit opposite the engagement shank 37. This shoe 38 is freely rotatable on the end of the screw 36, but is connected thereto by a head 36a so as to prevent loss from the screw. The shoe 38 and surface 37 are sufficiently large so that a large friction force can retain the fork 33 against shifting along the spit when the screw is tightened.

The boiler 30 is associated with a flow controller so that a discontinuous flow of steam is emitted. This regulator can work by a chopping technique interrupting temporarily the heating of the water in the boiler or by a technique which results in temporary reduction of the power supply to the electrically heated boiler.

The period for which the boiler is operable over the cooking period can be limited, e.g. via a timer which is connected in its power supply circuit or by the guaranty of water which is introduced into the boiler coupled with a thermostat to cutoff the power feed when the boiler is emptied.

To save energy, the infrared source 3 is associated with means for interrupting its supply with electrical power temporarily and cyclically. Control of the frequency of operation of the boiler and the infrared heaters can be effected through control means not illustrated except for the knobs 40 and 42 for controlling the frequency and duration of operation.

To position the spit carrying the fowl in the housing 2, it suffices to retract the socket 7 in the direction of the arrow 16 and drop the spit onto the cradle 18, then releasing the button 15 which will permit the spring 31 to drive the socket 7 against the formation 6 and press the ceiling surfaces 26 and 27 together. The motor of the drive unit is then energized and the infrared heaters turned on. Simultaneously, steam is fed from the boiler into the internal cavity of the fowl to which the interior is steamed while the exterior is cooked by the infrared energy.

The steam which escapes from the cavity deposits on the coolest surfaces most rapidly and the surfaces are non other than those of the fowl in most cases so that the latent heat of condensation s transferer to the fowl rapidly and contributes to the rapid cooking thereof.

Condensation which forms collects by gravity in the receptacle 23 and the moisture content of the housing is maintained by the introduction of steam so that there is no drying out and indeed a tender product is formed which is very tasty and easily consumed and digested.

At the end of cooking, the vapor which may be present in excess in the housing is vented at 43 and a blower 44 can be provided to mix a small amount of air with the steam which may be released through the vent 43 and thereby control the moisture content of the vented vapor.

The steam in the housing also tends to promote the formation of juices from the cooked product within the cavity of the fowl for automatic internal basting.

Since the steam introduced is at a pressure close to atmospheric, the planar surfaces 26 and 27 form a perfectly satisfactory seal against loss of steam at the rotary joint. As a result, practically all steam supplied is used in cooking of the fowl without losses.

The apparatus can be modified in various ways within the spirit and scope of the claimed invention and thus the spit 5 can be disposed perpendicularly to the disposition shown in the drawing, i.e. with the square socket being disposed at the rear of the oven and the vapor source and the rotary seal being provided between its front end and the front cradle of the frame.

The rotisserie of the invention can be used also for cooking other meats, such as roasts of beef or the like. In this case, as shown in FIG. 5, the cylindrical spit can be extended at its driven end into a point 5a which is connected via a cone 5b of slight conicity with the large diameter portion 5c forming the body of the spit.

The part 5c of large diameter is formed with the perforations 25 for admitting the steam into the roast while a further perforation 40 is provided to allow juices which may enter the spit to be drained therefrom. The spit is easily forced through the roast.

At the start of cooking, the hot steam heats the wall of the spit to cook the surrounding body of the roast and thus form between the roast and spit a space into which the steam is distributed to then cook more fully the inner surface of the roast.

The steam leaving this space and escaping by perforations 40 carries along juices which may collect in the spit and permit steam to contact the exterior surfaces of the roast to participate in the cooking thereof.

Rotisserie cuts and meats are cooked, therefore, more rapidly than by conventional methods and the fact that the roast has an annular configuration allows garnishment to be provided in the interior.

I claim:

1. A cooking apparatus, comprising:
   means in a housing for generating infrared cooking radiation therein;
   a tubular spit rotatable in said housing;
   drive means on said housing connectable with one end of said tubular spit for rotating same;
   a boiler for generating steam; and
   means forming a rotating joint between an opposite end of said spit and said boiler for admitting steam from said boiler into said spit, said spit being formed with at least one aperture opening from an interior of said spit to an exterior thereof in a region of said spit on which a food article is mounted.

2. The apparatus defined in claim 1, further comprising a frame received in said housing and forming a cradle rotatably carrying at least said opposite end of said spit, said rotating joint being defined by a nozzle fixed on said housing and a roller engaging said nozzle and rotating in said cradle.

3. The apparatus defined in claim 2, further comprising means for shifting said drive means from said one end of said spit and engaging said one end of said spit, respectively.

4. The apparatus defined in claim 3 wherein said drive unit includes a socket having a polygonal configuration engageable with a polygonal formation on said one end of said spit.

5. The apparatus defined in claim 4 wherein said socket is mounted on a shaft axially shiftable on said housing, further comprising an actuator operable from the exterior of said housing for shifting said shaft.

6. The apparatus defined in claim 5, further comprising a spring bearing on said shaft for urging said socket towards said spit and said spit against said nozzle.

7. The apparatus defined in claim 6 wherein said roller and said nozzle have planar faces in mutual engagement for sealing said rotary joint against escape of steam introduced into said spit.

8. The apparatus defined in claim 7 wherein said spit is cylindrical.

9. The apparatus defined in claim 1, further comprising control means connected to said means in said housing for generating infrared cooking radiation comprising at least one infrared heater and means for cyclically energizing said heater electrically at a controllable frequency.

10. The apparatus defined in claim 1 wherein said housing is provided with a venting orifice for excess steam, and a blower for mixing air with vented steam and disposed proximal to said venting orifice.

11. The apparatus defined in claim 1 wherein said spit is provided with a point at one end and a conical portion connecting said point to a large diameter portion constituting a major part of the length of said spit, said spit being provided with at least one passage opening between the interior and exterior thereof out of a region of said spit upon which a food article is to be mounted.

* * * * *